(12) United States Patent
Cheng et al.

(10) Patent No.: US 10,256,639 B2
(45) Date of Patent: Apr. 9, 2019

(54) REVERSE POWER SUPPLY MANAGEMENT METHOD, APPARATUS AND SYSTEM

(71) Applicant: ZTE CORPORATION, Shenzhen (CN)

(72) Inventors: Mingming Cheng, Shenzhen (CN); Weiliang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 137 days.

(21) Appl. No.: 15/317,689

(22) PCT Filed: Sep. 23, 2014

(86) PCT No.: PCT/CN2014/087227
§ 371 (c)(1),
(2) Date: Dec. 9, 2016

(87) PCT Pub. No.: WO2015/188510
PCT Pub. Date: Dec. 17, 2015

(65) Prior Publication Data
US 2017/0110885 A1    Apr. 20, 2017

(30) Foreign Application Priority Data

Jun. 10, 2014 (CN) .......................... 2014 1 0256793

(51) Int. Cl.
*H04B 1/04* (2006.01)
*H04L 12/10* (2006.01)
(Continued)

(52) U.S. Cl.
CPC .................. *H02J 4/00* (2013.01); *H04B 1/04* (2013.01); *H04L 12/10* (2013.01); *H04L 12/40045* (2013.01); *H04M 19/08* (2013.01)

(58) Field of Classification Search
USPC .......................................................... 307/11
See application file for complete search history.

(56) References Cited

U.S. PATENT DOCUMENTS 8,601,289 B1    12/2013  Smith et al.
9,413,902 B2     8/2016  Cheng et al.

FOREIGN PATENT DOCUMENTS

CN    102571502    7/2012
CN    103051462    4/2013
(Continued)

OTHER PUBLICATIONS

Extend European Search Report for EP 21087358, completed by the European Patent Office on May 15, 2017 All together 7 Pages.
(Continued)

*Primary Examiner* — Rexford Barnie
*Assistant Examiner* — Xuan Ly
(74) *Attorney, Agent, or Firm* — Plumsea Law Group, LLC

(57) ABSTRACT

A reverse power supply management method, apparatus and system are disclosed. The method includes: acquiring reverse power supply information of terminal devices of various links during a process that various terminal devices connected to a local end device stably perform reverse power supply on the local end device; determining reverse power supply management information of the various terminal devices according to the acquired reverse power supply information of the terminal devices of the various links; and transmitting respectively the reverse power supply management information of the various terminal devices to corresponding terminal devices to instruct the various terminal devices to adjust parameters for supplying reverse power to the local end device according to the received reverse power supply management information.

15 Claims, 3 Drawing Sheets

(51) Int. Cl.
*H02J 4/00* (2006.01)
*H04L 12/40* (2006.01)
*H04M 19/08* (2006.01)

(56) References Cited

FOREIGN PATENT DOCUMENTS

| CN | 103814552 | | 5/2014 |
|---|---|---|---|
| EP | 2120443 | | 5/2008 |
| EP | 2120442 | | 11/2009 |
| EP | 2120443 | * | 11/2009 |
| EP | 2362626 | | 8/2011 |

OTHER PUBLICATIONS

International Search Report for PCT/CN2014/087227, English translation attached to original, Both completed by the Chinese Patent Office on Dec. 18, 2014, All together 4 Pages.

* cited by examiner

REVERSE POWER SUPPLY MANAGEMENT METHOD, APPARATUS AND SYSTEM

CROSS-REFERENCE TO RELATED APPLICATION

This application is the U.S. national phase of PCT Application No. PCT/CN2014/087227 filed Sep. 23, 2014, which claims priority to Chinese Application No. 201410256793.3 filed Jun. 10, 2014, the disclosures of which are incorporated in their entirety by reference herein.

TECHNICAL FIELD

The present document relates to the field of communication, and in particular to a reverse power supply management method, apparatus and system.

BACKGROUND

With the rapid development of science and technology, the digital subscriber line (referred to as DSL for short) technology can provide voice, video and data services on the normal twisted pair, which has the characteristics, such as, high-speed access, low maintenance overheads, full use of existing network and use security, etc.

At present, the latest G.fast technology can provide asymmetrical transmission of which the net rates of the uplink and downlink are up to 1 Gbps on the twisted pair through expanding the spectrum.

FIG. 1 is a schematic diagram of a Fiber to the Distribution Point (referred to as the FTTDP for short) of reverse power supply supported by G.fast. As shown in FIG. 1, a local end device of fiber to Distribution Point (referred to as DP for short) is usually deployed in the basement or a wiring hole of the house; because of the complexity of the access environment, the power supply of the device is much difficult. If the special wires are laid from the public power supply to the local end device, the system deployment cost will be increased. Since the distance from the local end device to the terminal device is generally less than 200 meters, the reverse power supply may be performed on the local end device through a user terminal device.

When multiple user devices connected to the local end device performs the supply power on the local end device, no effective solution on the subject how to manage the reverse power supply is put forward at present.

SUMMARY

For the problem how to manage the reverse power supply when multiple user devices connected to a local end device performs the reverse power supply on the local end device, the present document provides a reverse power supply management method, apparatus and system, to at least solve the above problem.

A reverse power supply management method is provided according to one embodiment of present document, including: acquiring reverse power supply information of terminal devices of various links during a process that various terminal devices connected to a local end device stably perform reverse power supply on the local end device; determining reverse power supply management information of the various terminal devices according to the acquired reverse power supply information of the terminal devices of the various links; and transmitting respectively the reverse power supply management information of the various terminal devices to corresponding terminal devices to instruct the various terminal devices to adjust parameters for supplying reverse power to the local end device according to the received reverse power supply management information.

Alternatively, the reverse power supply information includes reverse power supply capability information of a terminal device and attribute information of a link.

Alternatively, said acquiring reverse power supply information of terminal devices of various links includes: the local end device acquiring the reverse power supply capability information of the various terminal device in a predetermined mode, herein, the reverse power supply capability information includes reverse power supply capacity, power status and service status; the local end device acquiring the attribute information of the various links in a predetermined mode, herein, the attribute information includes ascending order of a line and impedance characteristic of the line.

Alternatively, said transmitting respectively the reverse power supply management information of the various terminal devices to the various terminal devices includes: the local end device transmitting the reverse power supply management information of the various terminal devices to the corresponding terminal devices respectively through a specific channel or protocol.

Alternatively, said determining reverse power supply management information of the various terminal devices according to the acquired reverse power supply information of the terminal devices of the various links includes: the local end device determining power allocation of the reverse power supply of the various terminal devices by a first principle of balancing fairness and efficiency according to the reverse power supply information of the terminal devices of the various links; and/or, the local end device determining terminal devices participating in the reverse power supply in the various terminal devices and power supply time of the various terminal devices participating in the reverse power supply in each cycle by a second principle of balancing fairness and efficiency according to the reverse power supply information of the terminal devices of the various links; and/or, the local end device determining one or more terminal devices in the various terminal devices have no service or are in a battery status currently according to the reverse power supply information of the terminal devices of the various links, and determining the reverse power supply management information indicating that the reverse power supply is closed is required to be transmitted to the one or more terminal devices.

Alternatively, the first principle includes at least one of the following: the various terminal devices performing average power allocation; the power allocation being inversely proportional to a length of the link; more power being allocated to a link with better physical properties; more power being allocated to a terminal device with higher power supply; no power being allocated to a terminal device in a battery status; power allocated to a terminal device in an idle state being less than power allocated to a terminal device in a non-idle state; power only being allocated to a terminal device with a protocol; power allocation with a maximized efficiency being performed by overall considering various aspects of conditions recorded in the reverse power supply information of the various terminal devices and the attribute information of the corresponding links.

Alternatively, the local end device determining terminal devices participating in the reverse power supply in the various terminal devices by a second principle of balancing fairness and efficiency includes: the local end device determining that the terminal device currently with no service or in the battery status in the various terminal devices does not participate in the reverse power supply and other terminal devices participate in the reverse power supply.

Alternatively, the method further includes: when power consumption requirement of the local end device is changed, or when the number of the terminal devices connected to the local end device is changed, or when the reverse power supply information of the one or more terminal devices in the various terminal devices is changed, re-determining the reverse power supply management information of the various terminal devices, and transmitting the re-determined power supply management information of the various terminal devices to the corresponding terminal devices.

A reverse power supply management apparatus is provided according to another embodiment of the present document, including: an acquisition module, configured to acquire reverse power supply information of terminal devices of various links during a process that various terminal devices connected to a local end device stably perform reverse power supply on the local end device; a determination module, configured to determine reverse power supply management information of the various terminal devices according to the acquired reverse power supply information of the various terminal devices; and a transmission module, configured to transmit respectively the reverse power supply management information of the various terminal devices to the various terminal devices to instruct the various terminal devices to adjust parameters for supplying reverse power to the local end device according to the received reverse power supply management information.

Alternatively, the determination module includes: a first determination unit, configured to determine power allocation of the reverse power supply of the various terminal devices by a first principle of balancing fairness and efficiency; and/or, a second determination unit, configured to determine terminal devices participating in the reverse power supply in the various terminal devices and power supply time of the various terminal devices participating in the reverse power supply in each cycle by a second principle of balancing fairness and efficiency.

Alternatively, the acquisition module includes: a first acquiring unit, configured to acquire reverse power supply capability information of the various terminal devices in a predetermined mode, herein, the reverse power supply capability information includes reverse power supply capacity, power status and service status; a second acquiring unit, configured to acquire attribute information of the various links in a predetermined mode, herein, the attribute information includes: ascending order of a line and impedance characteristic of the line.

Alternatively, the apparatus further includes an update module configured to, when power consumption requirement of the local end device is changed, or when the number of the terminal devices connected to the local end device is changed, or when the reverse power supply information of one or more terminal devices in the various terminal devices is changed, re-determine the reverse power supply management information of the various terminal devices, and transmit the re-determined power supply management information of the various terminal devices to the corresponding terminal devices.

A local end device is provided according to another embodiment of the present document, which includes the above reverse power supply management apparatus.

A reverse power supply management system is provided according to another embodiment of the present document, including a local end device and one or more terminal devices, herein, the local end device includes the above reverse power supply management apparatus; and the terminal device is configured to receive reverse power supply management information transmitted by the local end device, and set power supply parameters for supplying power to the local end device according to the reverse power supply management information.

According to the present document, reverse power supply information of the various terminal devices currently connected to the local end device is collected. The reverse power supply management information of the various terminal devices is determined according to the collected reverse power supply information. The reverse power supply management information of the various terminal devices is transmitted to the corresponding terminal device to instruct the various terminal devices to adjust parameters for supplying the reverse power to the local end device according to the received reverse power supply management information. Therefore, the problem that the power supply management is unable to be performed on the terminal device of the reverse power supply is solved, and the power supply management can be performed efficiently on the terminal device of the reverse power supply, and the normal work of the local end device and the terminal device is ensured.

BRIEF DESCRIPTION OF DRAWINGS

The accompanying drawings described herein are used to provide further understanding for the present document and constitute a part of the present application. The illustrated embodiments of the present document and the description thereof are used to explain the present document, rather than constituting an inappropriate limitation to the present document. Herein.

SPECIFIC EMBODIMENTS

The present document is described in detail with reference to the accompanying drawings and in combination with embodiments hereinafter. It should be illustrated that, in the case of no conflict, the embodiments in the present application and features in these embodiments may be combined with each other.

A reverse power supply management method is provided according to an embodiment of the present document.

Figure 1:
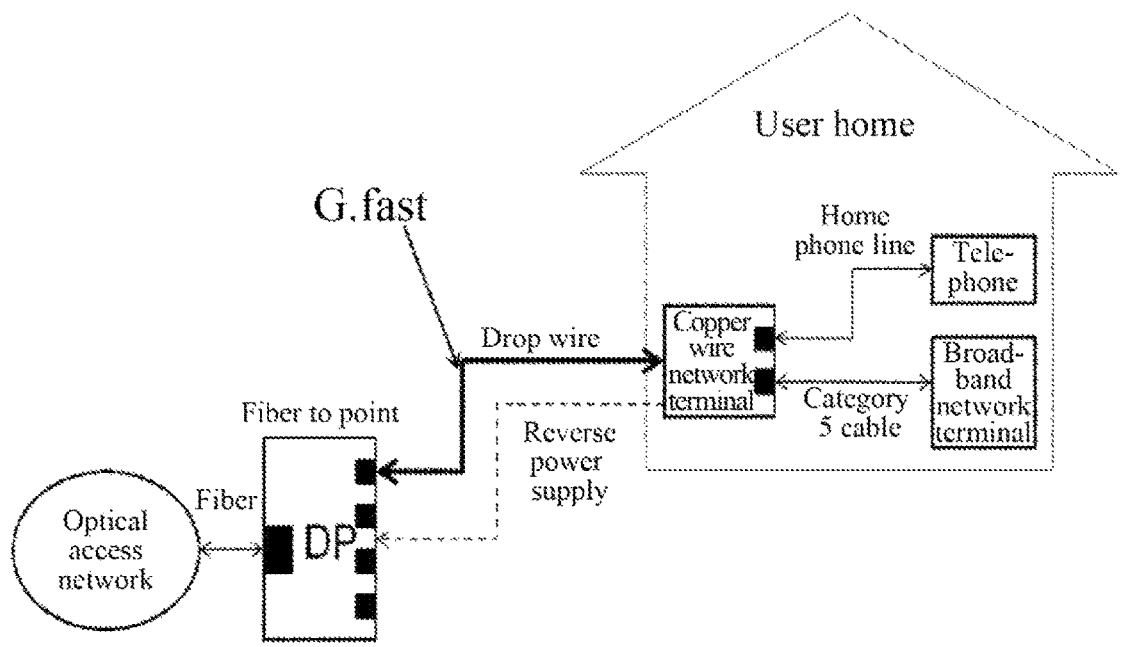
FIG. 1 is a schematic diagram of a Fiber to the Distribution Point FTTDP of reverse power supply supported by G.fast.
Figure 2:
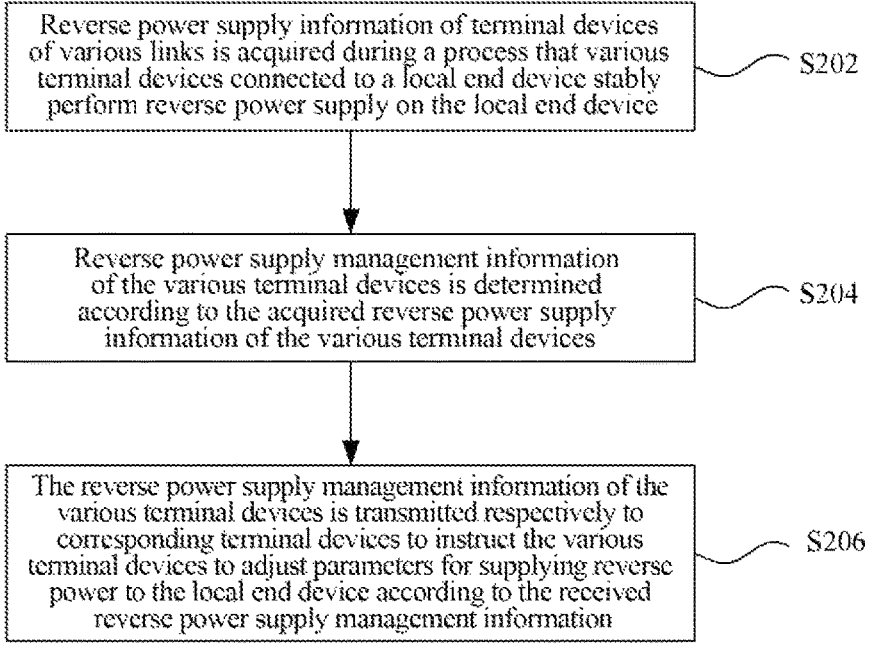
FIG. 2 is a flow chart of a reverse power supply management method according to an embodiment of the present document.

FIG. 2 is a flow chart of a reverse power supply management method according to an embodiment of the present document. As shown in FIG. 2, the method mainly includes the following step S202 to step S206.

In step S202, reverse power supply information of terminal devices of various links is acquired during a process that various terminal devices connected to a local end device stably perform reverse power supply on the local end device.

Alternatively, the step S202 may include that: the local end device may acquire reverse power supply capability information of the various terminal devices in a predetermined mode, herein, the reverse power supply capability information may include: reverse power supply capacity, power status and service status; the local end device acquires attribute information of the various links in a predetermined mode, herein, the attribute information includes ascending order of a line and impedance characteristic of the line.

In step S204, reverse power supply management information of the various terminal devices is determined according to the acquired reverse power supply information of the various terminal devices.

Alternatively, in step S204, determining the reverse power supply management information of the various terminal devices may include that: the local end device determines power allocation of the reverse power supply of the various terminal devices by a first principle of balancing fairness and efficiency according to the reverse power supply information of the terminal devices of the various links; and/or, the local end device determines terminal devices participating in the reverse power supply in the various terminal devices and power supply time of the various terminal devices participating in the reverse power supply in each cycle by a second principle of balancing fairness and efficiency according to the reverse power supply information of the terminal devices of the various links; and/or, the local end device determines one or more terminal devices in the various terminal devices have no service or are in a battery status currently according to the reverse power supply information of the terminal devices of the various links, and determines reverse power supply management information indicating that the reverse power supply is closed is required to be transmitted to the one or more terminal devices.

Alternatively, a power allocation principle includes at least one of the following: the various terminal devices performing average power allocation; the power allocation being inversely proportional to a length of the link; more power being allocated to a link with better physical properties; more power being allocated to a terminal device with higher power supply capability; no power being allocated to a terminal device in a battery status; power allocated to a terminal device in an idle state being less than power allocated to a terminal device in a non-idle state; power only being allocated to a terminal device with a protocol; power allocation with a maximized efficiency being performed by overall considering various aspects of conditions recorded in the reverse power supply information of the various terminal devices and the attribute information of the corresponding links.

Alternatively, when the local end device determines the terminal device participating in the reverse power supply in the various terminal devices according to a second principal of balancing fairness and efficiency, and determined that the terminal device currently with no service or in the battery status does not participate in the reverse power supply and other terminal devices participate in the reverse power supply in the various terminal devices.

In step S206, the reverse power supply management information of the various terminal devices is transmitted respectively to corresponding terminal devices to instruct the various terminal devices to adjust parameters for supplying reverse power to the local end device according to the received reverse power supply management information.

For example, the local end device may transmit the reverse power supply management information of the various terminal devices to the corresponding terminal devices respectively through a specific channel or protocol.

Alternatively, the method may further include: when power consumption requirement of the local end device is changed, or when the number of the terminal devices connected to the local end device is changed, or when the reverse power supply information of one or more terminal devices in the various terminal devices is changed, the reverse power supply management information of the various terminal devices is re-determined, and the re-determined power supply management information of the various terminal devices is transmitted to the corresponding terminal devices.

In the alternative embodiments of the present document, the reverse power supply management method may include the following steps. In step 1, various terminal devices connected to the local end device stably perform the reverse power supply on the local end device. In step 2, the local end device acquires link information in a specific way, including: a length of the line, impedance characteristic of the line, etc. In step 3, the local end device acquires information of the terminal device in a specific way, including: reverse power supply capacity, power status and service status, etc. In step 4, the local end device determines the reverse power supply management information of the terminal devices of the various links according to the collected information. In step 5, the local end device transmits the reverse power supply management information to the various terminal devices through a specific channel or protocol. In step 6, the various terminal devices adjust the parameters of its reverse power supply module in accordance with the reverse power supply management information. In step 7, the local end device transmits new reverse power supply management information when power consumption requirement of the local end device is changed. In step 8, the local end device transmits new reverse power supply management information when the number of the terminal devices connected to the local end device is changed. In step 9, the local end device transmits new reverse power supply management information when the accorded reverse power supply information is changed.

By using the above method provided by the embodiment of the present document, the local end device collects the reverse power supply information of various links, and then determines the reverse power supply management information of the terminal devices of the various links according to the reverse power supply information of the various links, and finally transmits the management information to the various terminal devices. Therefore, the problem that the reverse power supply management is unable to be realized is solved, and then the fairness of supplying the power for the local end device among the various terminal devices connected to the local end device is ensured. At the same time, also the power supply efficiency of the reverse power supply is improved.

A reverse power supply management apparatus is further provided according to an embodiment of the present document.

Figure 3:
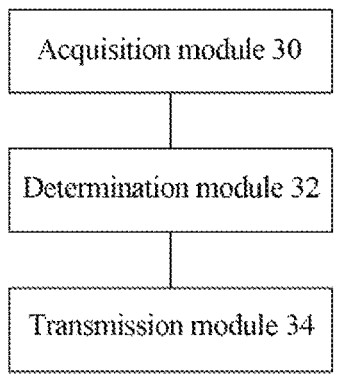
FIG. 3 is a structure diagram of a reverse power supply management apparatus according to an embodiment of the present document.

FIG. 3 is a structure diagram of a reverse power supply management apparatus according to an embodiment of the present document. As shown in FIG. 3, the apparatus mainly includes: an acquisition module 30, configured to acquire reverse power supply information of terminal devices of various links during a process that various terminal devices connected to a local end device stably perform reverse power supply on the local end device; a determination module 32, configured to determine reverse power supply management information of the various terminal devices according to the acquired reverse power supply information of the various terminal devices; and a transmission module 34, configured to transmit respectively the reverse power supply management information of the various terminal devices to the various terminal devices to instruct the various terminal devices to adjust parameters for supplying reverse power to the local end device according to the received reverse power supply management information.

Alternatively, the determination module 32 may include: a first determination unit, configured to determine power allocation of the reverse power supply of the various terminal devices by a first principle of balancing fairness and efficiency; and/or, a second determination unit, configured to determine terminal devices participating in the reverse power supply in the various terminal devices and power supply time of the various terminal devices participating in the reverse power supply in each cycle by a second principle of balancing fairness and efficiency.

Alternatively, the acquisition module 32 may include: a first acquiring unit, configured to acquire reverse power supply capability information of the various terminal devices in a predetermined mode, herein, the reverse power supply capability information includes reverse power supply capacity, power status and service status; and a second acquiring unit, configured to acquire attribute information of the various links in a predetermined mode, herein, the attribute information includes ascending order of a line and impedance characteristic of the line.

Alternatively, the apparatus further includes an update module configured to, when power consumption requirement of the local end device is changed, or when the number of the terminal devices connected to the local end device is changed, or when the reverse power supply information of one or more terminal devices in the various terminal devices is changed, re-determine the reverse power supply management information of the various terminal devices, and transmit the re-determined power supply management information of the various terminal devices to the corresponding terminal devices.

By using the above apparatus provided by the embodiment of the present document, the reverse power supply information of the various links between the local end device and the terminal devices is collected, and then the reverse power supply management information of the various links is determined according to that, and finally the management information is transmitted to the various terminal devices. Therefore, the problem that the reverse power supply management is unable to be realized is solved, and the fairness of supplying the power for the local end device among the various terminal devices connected to the local end device is ensured. At the same time, also the power supply efficiency of the reverse power supply is improved.

A local end device is further provided according to an embodiment of the present document, which includes the above reverse power supply management apparatus.

A reverse power supply management system is further provided according to an embodiment of the present document. The reverse power supply management system includes a local end device and one or more terminal devices. Herein, the local end device includes the above reverse power supply management apparatus. The terminal device is configured to receive reverse power supply management information transmitted by the local end device, and set power supply parameters for supplying power to the local end device according to the reverse power supply management information.

By using the above reverse power supply management system provided by the embodiment of the present document, the local end device collects the reverse power supply information of various links, and then determines the reverse power supply management information of the terminal devices of the various links according to that, and finally transmits the management information to the various terminal devices. And the various terminal devices set the power supply parameters for supplying power to the local end device according to that management information. Therefore, the problem that the reverse power supply management is unable to be realized is solved, and then the fairness of supplying the power for the local end device among the various terminal devices connected to the local end device is ensured. At the same time also the power supply efficiency of the reverse power supply is improved.

The technical scheme provided by the embodiment of the present document is described through the specific embodiments hereinafter.

Embodiment One

The present embodiment describes the reverse power supply management scheme which is provided by the embodiment of the present document by taking the power allocation of the reverse power supply as an example.

Figure 4:
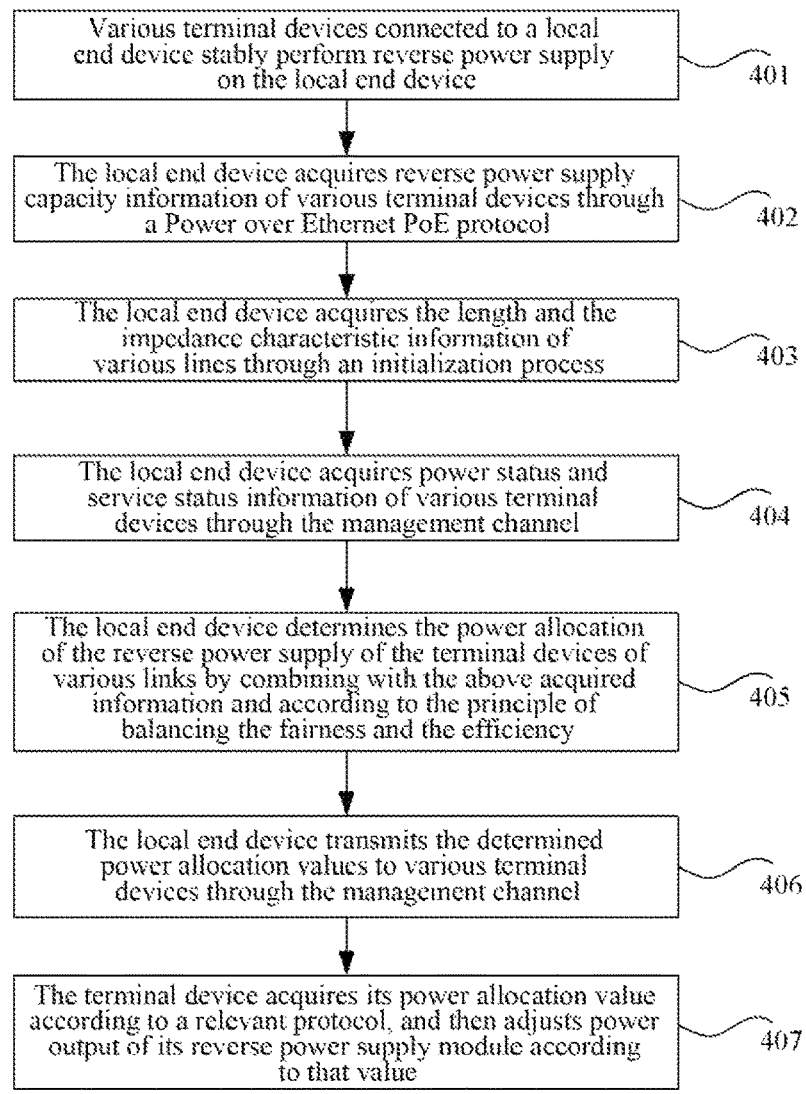
FIG. 4 is a flow chart of embodiment one.

FIG. 4 is a flow chart of performing the power allocation of the reverse power supply in the present embodiment. As shown in FIG. 4, the power allocation of the reverse power supply mainly includes the following steps.

In step 401, various terminal devices connected to a local end device stably perform the reverse power supply on the local end device.

In step 402, the local end device acquires reverse power supply capacity information of the various terminal devices through a Power over Ethernet PoE protocol.

In step 403, the local end device acquires the length and the impedance characteristic information of various links through an initialization process.

In step 404, the local end device acquires the power status and service status information of various terminal devices through the management channel.

In step 405, the local end device determines the power allocation of the reverse power supply of the terminal devices of various links by combining with the above acquired information and according to the principle of balancing the fairness and the efficiency.

Herein, the power allocation principle includes that: various user terminal perform average power allocation; or, the power allocation is inversely proportional to a length of the link; or, more power is allocated to a link with better physical properties; or, more power is allocated to a user terminal with higher power supply capability; or, no power is allocated to a user terminal in a battery status; or, less power is allocated to a user terminal in an idle status; or, power only is allocated to a user terminal with a protocol for the power supply; or, power allocation with a maximized efficiency is performed by overall considering various aspects of conditions.

In step 406, the local end device transmits the determined power allocation values to the various terminal devices through the management channel (for example, an embedded operation channel EOC command).

In step 407, the terminal device acquires its power allocation value according to a relevant protocol, and then adjusts power output of its reverse power supply module according to that value.

Embodiment Two

The present embodiment is described by taking reverse power supply enabling management as an example.

Figure 5:
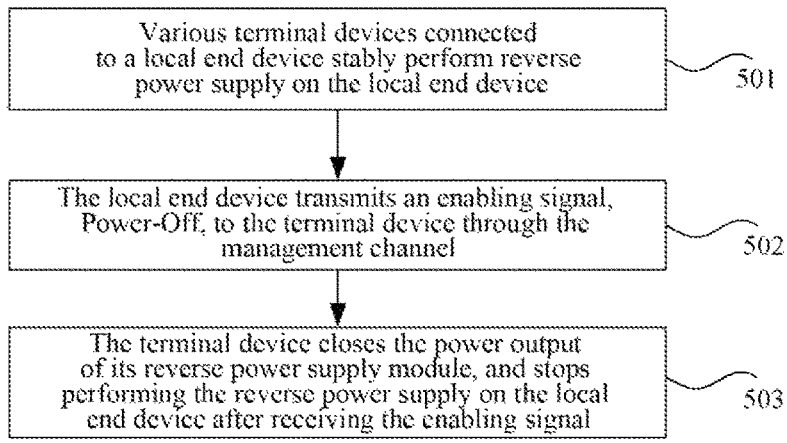
FIG. 5 is a flow chart of embodiment two.

FIG. 5 is a flow chart of the reverse power supply enabling management in the present embodiment. As shown in FIG. 5, the reverse power supply enabling management mainly includes the following steps.

In step 501, various terminal devices connected to a local end device stably perform the reverse power supply on the local end device.

In step 502, the local end device transmits an enabling signal, Power-Off, to a certain terminal device through the management channel (for example, the operation embedded channel EOC command) when that device terminal has no service or enters a battery power supply status.

In step 503, the terminal device closes the power output of its reverse power supply module, and stops performing the reverse power supply on the local end device after receiving the enabling signal.

Embodiment Three

The present embodiment is described by taking reverse power supply time management as an example.

Figure 6:
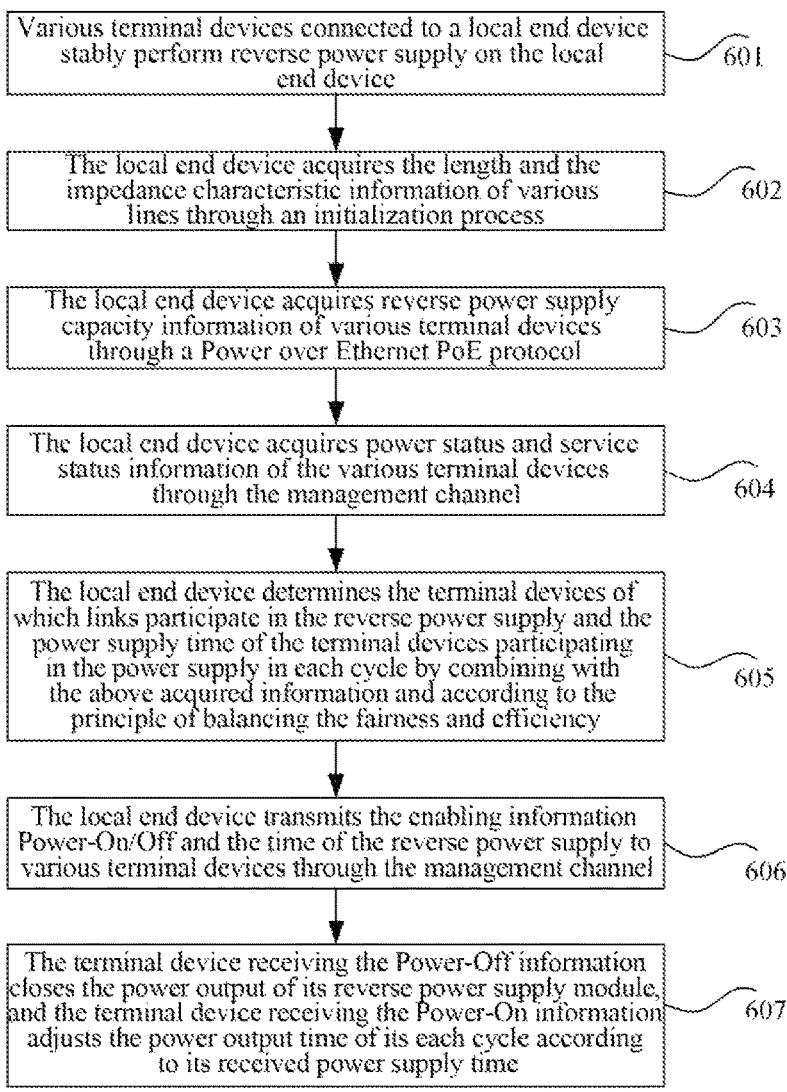
FIG. 6 is a flow chart of embodiment three.

FIG. 6 is a flow chart of the reverse power supply time management in the present embodiment. As shown in FIG. 6, the reverse power supply time management mainly includes the following steps.

In step 601, various terminal devices connected to the local end device stably perform the reverse power supply on the local end device.

In step 602, the local end device acquires the length and the impedance characteristic information of various lines through an initialization process.

In step 603, the local end device acquires the reverse power supply capacity information of various terminal devices through a Power over Ethernet PoE protocol.

In step 604, the local end device acquires the power status and service status information of the various terminal devices through the management channel.

In step 605, the local end device determines the terminal devices of which links participate in the reverse power supply (the terminal device with no service or in the battery status does not participate in the reverse power supply, and the terminal devices of other links participate in the reverse power supply) and the power supply time of the terminal device participating in the power supply in each cycle by combining with the above acquired information and according to the principle of balancing the fairness and efficiency.

In step 606, the local end device transmits the enabling information, Power-On/Off, and the time of the reverse power supply to the various terminal devices through the management channel (for example, the embedded operation channel EOC command).

In step 607, after the terminal device acquires the above information according to the relevant protocol, the terminal device receiving the Power-Off information closes the power output of its reverse power supply module, and the terminal device receiving the Power-On information adjusts the power output time of its each cycle according to the received power supply time.

From the above descriptions, it can be seen that the embodiment of the present document realizes the technical effects as follows. The embodiment of the present document solves the problem that the reverse power supply management is unable to be realized, and then ensures the fairness of supplying the power for the local end device among the various terminal devices connected to the local end device, and at the same time also improves the efficiency of the reverse power supply.

Obviously, it can be understood by those skilled in the art that each module or each step above-mentioned in the present document can be implemented by the universal calculating apparatus, and they can be integrated in a single calculating apparatus, or distributed in the network consisting of a plurality of calculating apparatus. Alternatively, they can be implemented by the executable program codes of the calculating apparatus. Accordingly, they may be stored in the storage apparatus and implemented by the calculating apparatus, and in some situations, the shown or described steps may be executed according to a sequence different from here, or they are respectively made into various integrated circuit modules, or a plurality of modules or steps therein are made into the single integrated circuit module to be implemented. Therefore, the present document is not limit to any specific form of the combination of the hardware and software.

The above description is only the embodiments of the present document and is not intended to limit the present document. For those skilled in the art, the present document may have various modifications and variations. All of modifications, equivalents and/or improvements without departing from the rule and essence of the present document should be embodied in the protection scope of the present document.

INDUSTRIAL APPLICABILITY

Based on the above technical scheme provided by the embodiment of the present document, reverse power supply information of various terminal devices currently connected to the local end device is collected. The reverse power supply management information of the various terminal devices is determined according to the collected reverse power supply information. The reverse power supply management information of the various terminal devices is transmitted to the corresponding terminal devices to instruct the various terminal devices to adjust parameters for supplying the reverse power to the local end device according to the received reverse power supply management information. Therefore, the problem that the power supply management is unable to be performed on the terminal device of the reverse power supply is solved, and the power supply management can be performed efficiently on the terminal device of the reverse power supply, and the normal work of the local end device and the terminal device is ensured.

What we claim is:

1. A reverse power supply management method, comprising:
   acquiring reverse power supply information of terminal devices of various links during a process that various terminal devices connected to a local end device stably perform reverse power supply on the local end device;
   determining reverse power supply management information of the various terminal devices according to the acquired reverse power supply information of the terminal devices of the various links; and
   transmitting respectively the reverse power supply management information of the various terminal devices to corresponding terminal devices to instruct the various terminal devices to adjust parameters for supplying reverse power to the local end device according to the received reverse power supply management information;

wherein, the reverse power supply information comprises: reverse power supply capability information of a terminal device and attribute information of a link;

wherein, said acquiring reverse power supply information of terminal devices of various links comprises:

the local end device acquiring the reverse power supply capability information of the various terminal devices in a predetermined mode, wherein, the reverse power supply capability information comprises reverse power supply capacity, power status and service status;

the local end device acquiring the attribute information of the various links in a predetermined mode, wherein, the attribute information comprises a length of a line and impedance characteristic of the line.

2. The method according to claim 1, wherein, said transmitting respectively the reverse power supply management information of the various terminal devices to the various terminal devices comprises:

the local end device transmitting the reverse power supply management information of the various terminal devices to the corresponding terminal devices respectively through a specific channel or protocol.

3. The method according to claim 1, wherein, said determining reverse power supply management information of the various terminal devices according to the acquired reverse power supply information of the terminal devices of the various links comprises:

the local end device determining power allocation of the reverse power supply of the various terminal devices by a first principle of balancing fairness and efficiency according to the reverse power supply information of the terminal devices of the various links; and/or, the local end device determining terminal devices participating in the reverse power supply in the various terminal devices and power supply time of the various terminal devices participating in the reverse power supply in each cycle by a second principle of balancing fairness and efficiency according to the reverse power supply information of the terminal devices of the various links; and/or, the local end device determining one or more terminal devices in the various terminal devices have no service or are in a battery status currently according to the reverse power supply information of the terminal devices of the various links, and determining the reverse power supply management information indicating that the reverse power supply is closed is required to be transmitted to the one or more terminal devices.

4. The method according to claim 3, wherein, the first principal comprises at least one of the following: the various terminal devices performing average power allocation; the power allocation being inversely proportional to a length of the link; more power being allocated to a link with better physical properties; more power being allocated to a terminal device with higher power supply capability; no power being allocated to a terminal device in a battery status; power allocated to a terminal device in an idle state being less than power allocated to a terminal device in a non-idle state; power only being allocated to a terminal device with a protocol; power allocation with a maximized efficiency being performed by overall considering various aspects of conditions recorded in the reverse power supply information of the various terminal devices and the attribute information of the corresponding links.

5. The method according to claim 3, wherein, the local end device determining terminal devices participating in the reverse power supply in the various terminal devices by a second principle of balancing fairness and efficiency comprises:

the local end device determining that the terminal device currently with no service or in the battery status in the various terminal devices does not participate in the reverse power supply and other terminal devices participate in the reverse power supply.

6. The method according to claim 1, wherein, the method further comprises: when power consumption requirement of the local end device is changed, or when the number of the terminal devices connected to the local end device is changed, or when the reverse power supply information of the one or more terminal devices in the various terminal devices is changed, re-determining the reverse power supply management information of the various terminal devices, and transmitting the re-determined power supply management information of the various terminal devices to the corresponding terminal devices.

7. A reverse power supply management apparatus, comprising:

an acquisition module, configured to acquire reverse power supply information of terminal devices of various links during a process that various terminal devices connected to a local end device stably perform reverse power supply on the local end device; a determination module, configured to determine reverse power supply management information of the various terminal devices according to the acquired reverse power supply information of the various terminal devices; and a transmission module, configured to transmit respectively the reverse power supply management information of the various terminal devices to the various terminal devices to instruct the various terminal devices to adjust parameters for supplying reverse power to the local end device according to the received reverse power supply management information;

wherein, the acquisition module comprises:

a first acquiring unit, configured to acquire reverse power supply capability information of the various terminal devices in a predetermined mode, wherein, the reverse power supply capability information comprises reverse power supply capacity, power status and service status;

a second acquiring unit, configured to acquire attribute information of the various links in a predetermined mode, wherein, the attribute information comprises a length of a line and impedance characteristic of the line.

8. The apparatus according to claim 7, wherein, the determination module comprises:

a first determination unit, configured to determine power allocation of the reverse power supply of the various terminal devices by a first principle of balancing fairness and efficiency; and/or, a second determination unit, configured to determine terminal devices participating in the reverse power supply in the various terminal devices and power supply time of the various terminal devices participating in the reverse power supply in each cycle by a second principle of balancing fairness and efficiency.

9. The apparatus according to claim 7, wherein, the apparatus further comprises: an update module configured to, when power consumption requirement of the local end device is changed, or when the number of the terminal devices connected to the local end device is changed, or when the reverse power supply information of one or more terminal devices in the various terminal devices is changed, re-determine the reverse power supply management information of the various terminal devices, and transmit the re-determined power supply management information of the various terminal devices to the corresponding terminal devices.

10. A local end device, comprising the apparatus according to claim 7.

11. A reverse power supply management system, comprising a local end device and one or more terminal devices, wherein, the local end device comprises the apparatus according to claim 7; and the terminal device is configured to receive reverse power supply management information transmitted by the local end device, and set power supply parameters for supplying power to the local end device according to the reverse power supply management information.

12. The method according to claim 2, wherein, the method further comprises: when power consumption requirement of the local end device is changed, or when the number of the terminal devices connected to the local end device is changed, or when the reverse power supply information of the one or more terminal devices in the various terminal devices is changed, re-determining the reverse power supply management information of the various terminal devices, and transmitting the re-determined power supply management information of the various terminal devices to the corresponding terminal devices.

13. The method according to claim 3, wherein, the method further comprises: when power consumption requirement of the local end device is changed, or when the number of the terminal devices connected to the local end device is changed, or when the reverse power supply information of the one or more terminal devices in the various terminal devices is changed, re-determining the reverse power supply management information of the various terminal devices, and transmitting the re-determined power supply management information of the various terminal devices to the corresponding terminal devices.

14. The method according to claim 4, wherein, the method further comprises: when power consumption requirement of the local end device is changed, or when the number of the terminal devices connected to the local end device is changed, or when the reverse power supply information of the one or more terminal devices in the various terminal devices is changed, re-determining the reverse power supply management information of the various terminal devices, and transmitting the re-determined power supply management information of the various terminal devices to the corresponding terminal devices.

15. The method according to claim 5, wherein, the method further comprises: when power consumption requirement of the local end device is changed, or when the number of the terminal devices connected to the local end device is changed, or when the reverse power supply information of the one or more terminal devices in the various terminal devices is changed, re-determining the reverse power supply management information of the various terminal devices, and transmitting the re-determined power supply management information of the various terminal devices to the corresponding terminal devices.

* * * * *